(12) United States Patent
Antila

(10) Patent No.: US 6,674,060 B2
(45) Date of Patent: Jan. 6, 2004

(54) METHOD AND APPARATUS FOR ILLUMINATING AN OBJECT WITH WHITE LIGHT

(75) Inventor: Mika Antila, Tampere (FI)

(73) Assignee: Nokia Corporation, Espoo (FI)

( * ) Notice: Subject to any disclaimer, the term of this patent is extended or adjusted under 35 U.S.C. 154(b) by 93 days.

(21) Appl. No.: 09/985,729

(22) Filed: Nov. 6, 2001

(65) Prior Publication Data

US 2002/0113192 A1 Aug. 22, 2002

(30) Foreign Application Priority Data

Nov. 6, 2000 (FI) ................................................. 002430

(51) Int. Cl.[7] ................................................. G01J 1/32
(52) U.S. Cl. ......................................... 250/205; 345/39
(58) Field of Search .......................... 250/205, 214 AL, 250/214 R, 216, 226; 348/223, 227, 265; 345/7–10, 22, 24, 38, 39, 82, 83, 87, 88

(56) References Cited

U.S. PATENT DOCUMENTS

| 5,731,794 | A |   | 3/1998 | Miyazawa |
| 5,748,237 | A | * | 5/1998 | Ueda et al. ............ 348/333.08 |
| 5,886,681 | A |   | 3/1999 | Walsh et al. |
| 5,998,925 | A |   | 12/1999 | Shimizu et al. |
| 6,344,641 | B1 | * | 2/2002 | Blalock et al. ............. 250/205 |

FOREIGN PATENT DOCUMENTS

| EP | 1077444 | 2/2001 |
| JP | 11-295689 | 10/1999 |
| WO | 9963515 | 12/1999 |

OTHER PUBLICATIONS

Brightness and Color Temperature Control on Thin Film Transistor/Liquid Crystal Display, IBM Technical Disclosure Bulletin, vol. 40, No. 8, Aug. 1997, p27.

White Balance Control Method on Liquid Crystal Display, IBM Technical Disclosure Bulletin, vol. 37, No. 11, Nov. 1994, pp. 425–426.

* cited by examiner

*Primary Examiner*—Que T. Le
(74) *Attorney, Agent, or Firm*—Antonelli, Terry, Stout & Kraus, LLP

(57) ABSTRACT

A method and apparatus for illuminating an object with white light, in which method the object is illuminated using lights of at least two different colors. The intensities of the lights are measured and then the intensity of illumination provided by means of a light of a single color is adjusted on the basis of the measured intensities of illumination provided by means of at least two different colors to improve the white balance of the object's illumination.

20 Claims, 7 Drawing Sheets

METHOD AND APPARATUS FOR ILLUMINATING AN OBJECT WITH WHITE LIGHT

FIELD OF THE INVENTION

The present invention relates to white illumination, particularly to white illumination of a display.

BACKGROUND OF THE INVENTION

The human eye perceives three main components of light: blue, red and green. On the basis of the ratio of the intensities of the main components, vision produces the visual sensation experienced by the viewer. Since vision is based on the ratio of the intensities, it compares the ratios of the main colour components of the light reflected by the object displayed with the colour of ambient light.

The colours of images shown on a display should look natural, i.e. the ratio of the intensities of the main components should correspond to the ratio the object would reflect when displayed in natural light. This naturally requires that when the object is being imaged, the balance between the main components, i.e. the white balance, should be adjusted to natural. Correspondingly, when images are to be reproduced, the display should naturally be capable of producing the displayed image correctly, i.e. the ratio of intensities of the main components should be correct.

When images are to be displayed, light may be directed towards the viewer to produce the image. This takes place for instance in television where a coloured picture is formed using three colour projectors. Another method is to form the picture on the surface whereby ambient light or light passing through the surface makes the image visible on portions of the surface to the viewer. One example of this is liquid crystal displays, or LCDs. A drawback of these displays is that in dim light the image (or text) displayed is difficult to distinguish. This is why liquid crystal displays are often provided with back or front illumination to illuminate the display by allowing white light either to reflect from the portion of the liquid crystal display that forms the image or to conduct through it. However, the illumination should not distort the colours of the picture so that they look unnatural and this is why the illumination must be provided using white light.

There are various ways of producing white light, but in mobile stations, for instance, usually the appropriate way to illuminate the display is to use relatively small components of low energy consumption. U.S. Pat. No. 5,998,925 discloses one example of illuminating the display with white LED (Light Emitting Diode) components. The white LED in question is produced by coating a blue LED with broadband, yellow phosphor which renders the light emitted by the LED white. The phosphorous layer absorbs some of the intensity produced by the blue LED and corrects the colour of the light so that it becomes white, transforming, however, at the same time some of the luminous power into heat. In fact, a better efficiency can be obtained by using LEDs of the main component colours together to produce white light, as disclosed in U.S. Pat. No. 5,731,794. However, white light is difficult to produce with LEDs of different colours, because ageing and the temperature of the LEDs change their brightness.

In addition to the above problems, the white colour of the display varies not only because of a specific display illumination but also due to the impact of ambient light. Indoors, at the light of an incandescent lamp, the LCD display of a prior art laptop computer, which is illuminated by back or front illumination, looks typically slightly bluish, whereas outdoors it looks slightly reddish or yellowish. The phenomenon is caused by the change in the spectral distribution of ambient light.

SUMMARY OF THE INVENTION

The present invention provides a method and apparatus which allow the above problems to be avoided or their impact to be reduced.

According to a first aspect of the invention, there is provided a method for producing white light for illuminating an object, in which method light of a first colour having a first luminous power and light of a second colour having a second luminous power are produced to illuminate the object, the method being characterised in that it comprises the steps of measuring the first luminous power;
measuring the second luminous power; and
adjusting the white balance of the object's illumination by adjusting at least the first or the second luminous power at least on the basis of the luminous powers of the lights of the at least first and second colours.

Luminous power in this context refers to the light energy emitted by a light source per unit of time. The measurement of luminous power refers to the measurement of luminous power, or intensity, falling on a specific surface area, the measurement taking place at a specific distance from the light source and correlating with the emitted light efficiency.

An advantage of the method is that it provides an illumination having a white balance that can be corrected in response to changes in the illumination due to wearing of the light source or temperature changes, for example. In addition, the method allows lights of a plural number of different colours to be used for illuminating the object, while enabling a good white balance of the illumination to be maintained at the same time. The efficiency of the illumination is therefore better than for example if a light source of a single colour were used in which case some of the spectrum would be absorbed using a colour filter.

Preferably, lights of at least three different colours are produced for illuminating the object. Preferably the colours comprise blue, red and green. This allows an illumination approximating natural light to be provided.

Preferably the method also includes the measurement of the white balance of the object's ambient light and the adjustment of the luminous power of the light to be produced that comprises at least one colour in relation to at least one of the other luminous efficiencies to make the luminous power correspond better to the measured white balance of ambient light. This allows to compensate for the impact of changes in ambient light on the colours of the object.

Preferably in the method, said luminous powers of lights of different colours are preferably measured alternately, using at least partially common processing means. The use of common processing means renders the method of the invention inexpensive and relatively easy to implement for use in current and future digital devices.

The white balance of the object's illumination is preferably adjusted during illumination, for example, at periodically recurring intervals, or continuously.

Preferably the white balance of the object's illumination is controlled at a specific slowness to stabilise the control. The control is preferably carried out in small steps.

Preferably a first measurement unit is applied for measuring the luminous power of light of a first colour in a significantly normalised illumination with regard to the light in question to allow at least one individual measurement unit characteristic to be determined and to be used for correcting a later measurement. This allows the error caused into the white balance adjustment by the difference in the measurements of ambient light and illumination to be reduced.

The object to be illuminated with the method is preferably a display, the method also involving the presentation of visual information on the display.

The intensities referred to are preferably measured using measurement devices arranged in the vicinity of the display.

According to a second aspect of the invention, an apparatus for illuminating an object with white light is provided, the apparatus comprising:

first illuminating means for producing light of a first colour having a first luminous power;

second illuminating means for producing a light of a second colour having a second luminous power;

the apparatus being characterised in that it further comprises means for measuring the first luminous power;

means for measuring the second luminous power; and means for adjusting the white balance of the object's illumination by adjusting at least the first or second luminous power on the basis of the at least first and second luminous powers.

The apparatus preferably comprises more illuminating means for producing at least one light of a different colour. Yet more preferably the illumination of the object is carried out using lights of at least three different colours, which comprise blue, red and green light. This allows an illumination approximating natural light to be provided.

The apparatus preferably comprises also means for measuring the white balance of the object's ambient light and for adjusting at least one luminous power in relation to the measured white balance of ambient light. This allows to compensate for the impact of changes in ambient light on the colours of the object.

The apparatus preferably also comprises at least partially common processing means for alternately measuring the different luminous powers. Yet more preferably the at least partially common processing means are also arranged to adjust at least one luminous power. Due to the at least partially common processing means the apparatus of the invention is inexpensive and fairly easy to implement.

The apparatus is preferably arranged to adjust the white balance of the object's illumination during the illumination, for example, at periodically recurring intervals or continuously.

The apparatus is preferably arranged to adjust the white balance of the object's illumination at a predetermined slowness to stabilise the control, and even more preferably in small steps.

The apparatus is preferably arranged to apply a first measurement unit to measure the luminous power of light of a first colour in a significantly normalised illumination with regard to the light in question to determine at least one individual measurement unit characteristic and to use it for correcting a later measurement.

Preferably the apparatus comprises a display for visual presentation of information, the display being the object to be illuminated.

The means for measuring the first luminous power and the means for measuring the second luminous power are preferably arranged in the vicinity of the display.

The apparatus preferably comprises a photoconductor arranged in the vicinity of the display for conducting light to the display. The means for measuring the first luminous power and the means for measuring the second luminous power are preferably arranged in the vicinity of the photoconductor to measure the intensities of illumination provided by lights of different colours conducted through the photoconductor.

According to an alternative embodiment a portion of the display is arranged to serve at least occasionally as means for measuring at least one luminous power.

The at least one set of illuminating means is preferably arranged to make light scintillate according to a PWM-signal (Pulse Width Modulation). The luminous power of these illuminating means is preferably adjusted by changing the cycle ratio of the PWM-signal to adjust the glimmering so that a desired luminous power will be produced.

The invention is suitable for use in diverse objects, such as mobile stations, electronic books, digital cameras, digital video cameras, portable computers, displays provided with back illumination and those provided with front illumination.

BRIEF DESCRIPTION OF THE DRAWINGS

In the following the invention will be described by way of example with reference to the accompanying drawings, in which.

DETAILED DESCRIPTION OF THE INVENTION

Figure 1:
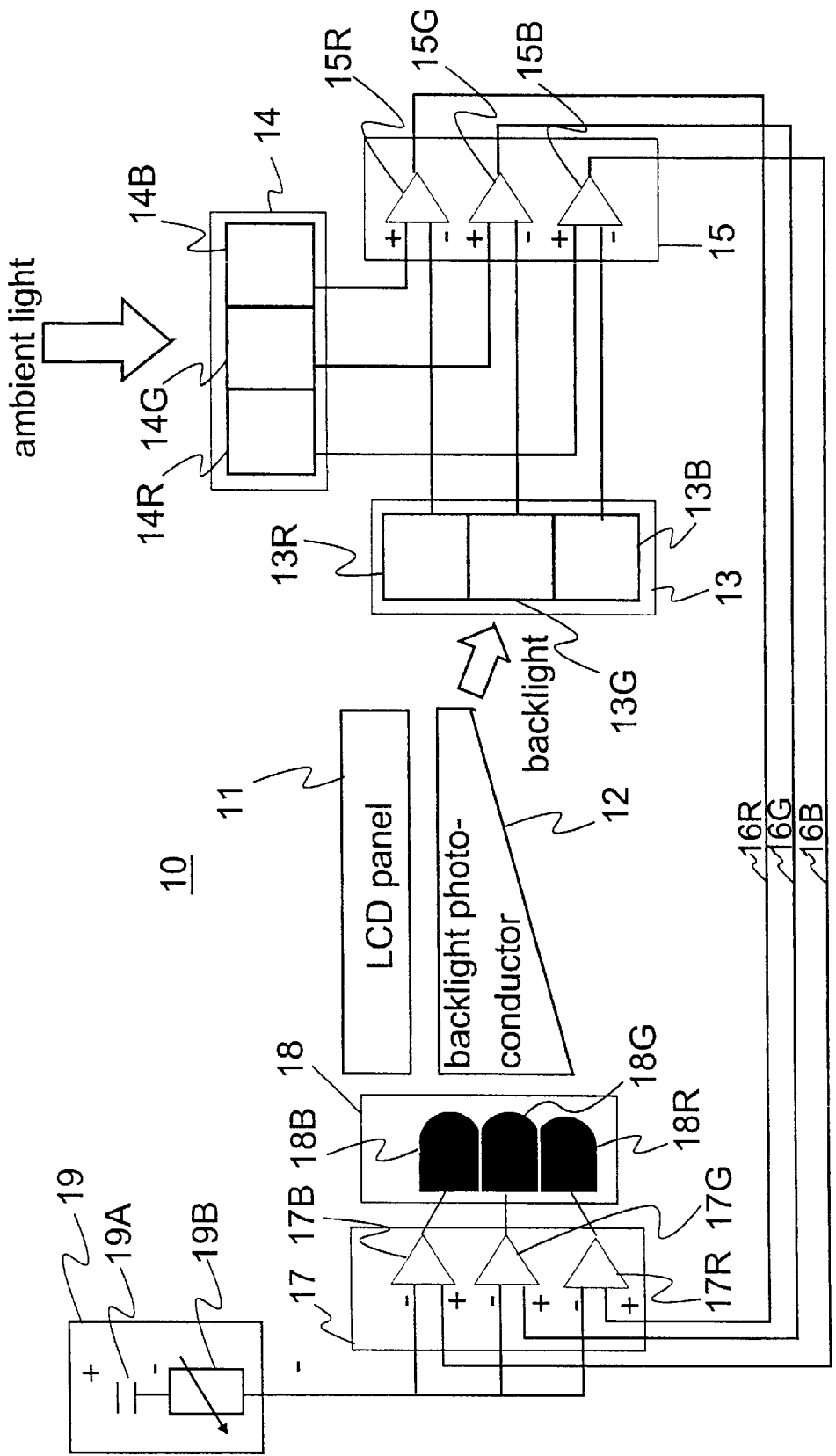
FIG. 1 illustrates a back-illumination system of a first embodiment of the invention.

FIG. 1 illustrates a back-illumination system 10 of a first embodiment of the invention. The back-illumination system 10 comprises a transparent, coloured liquid crystal display panel 11, a photoconductor 12 behind the liquid crystal display and a colour balance sensor 13 for the back illumination, arranged in connection with the photoconductor, and a colour balance sensor 14 for ambient light. Both colour balance sensors are connected in series with a first differential amplifier 15, a second differential amplifier 17 and an illuminator 18. The back-illumination system 10 further comprises an adjustable power source 19 for operating the illuminator 18. Both colour balance sensors 13 and 14 comprise R (red), G (green) and B (blue) units for measuring the intensities of the main components, i.e. red, green and blue light. The units are marked with corresponding letters after the reference numeral. The first and the second differential amplifiers both comprise corresponding three different units for the main components. The illuminator 18 also comprises corresponding three different units for forming the different main components. In the following, the operation of the system will be described in detail.

When the system is in operation, the photoconductor 12 conducts a backlight behind the liquid crystal display, the backlight comprising the three main components, i.e. red, green and blue. The first colour balance sensor 13 is optically arranged in connection with the photoconductor 12 (in this case after the photoconductor) to measure the intensities of the photoconductor's main components using respective measurement units 13R, 13G and 13B. Correspondingly, the second colour balance sensor 14 measures the intensities of the main components of ambient light using measurement units 14R, 14G and 14B. The measurement units of both colour balance sensors are arranged to produce output signals having the same sign. The outputs of the units corresponding to each main component of the first and the second colour balance sensors are led to the corresponding amplifier unit 15R, 15G and 15B in the first differential amplifier 15. For example, output signals corresponding to the red main component are relayed to the amplifier unit 15R in the first differential amplifier, the amplifier unit generating an amplified difference signal 16R proportional to the difference of the output signals of the measurement units 13R and 14R. Amplified difference signals 16G and 16B are also correspondingly generated. The amplified difference signals 16R, 16G and 16B are relayed to the second differential amplifier 17. The second differential amplifier 17 comprises amplifier units 17R, 17G and 17B for the main components. In addition to the amplified difference signals, a supply signal having a minus sign is supplied to the second differential amplifier from the adjustable power source 19. Each amplifier unit amplifies the supply signal coming from the amplifier unit and one amplified difference signal, and then generates an output proportional to the difference of the signals for operating an illuminating unit of an illuminator corresponding to one of the main components. This produces a feedback that adjusts the intensities of the illuminator's main components and, in an ideal case, controls the colour balance of the backlight to be in line with that of ambient light.

In an alternative embodiment of the invention, the colour balance sensors are scaled with resistors and/or amplifiers to set the brightness of the illumination to a desired level.

Figure 2:
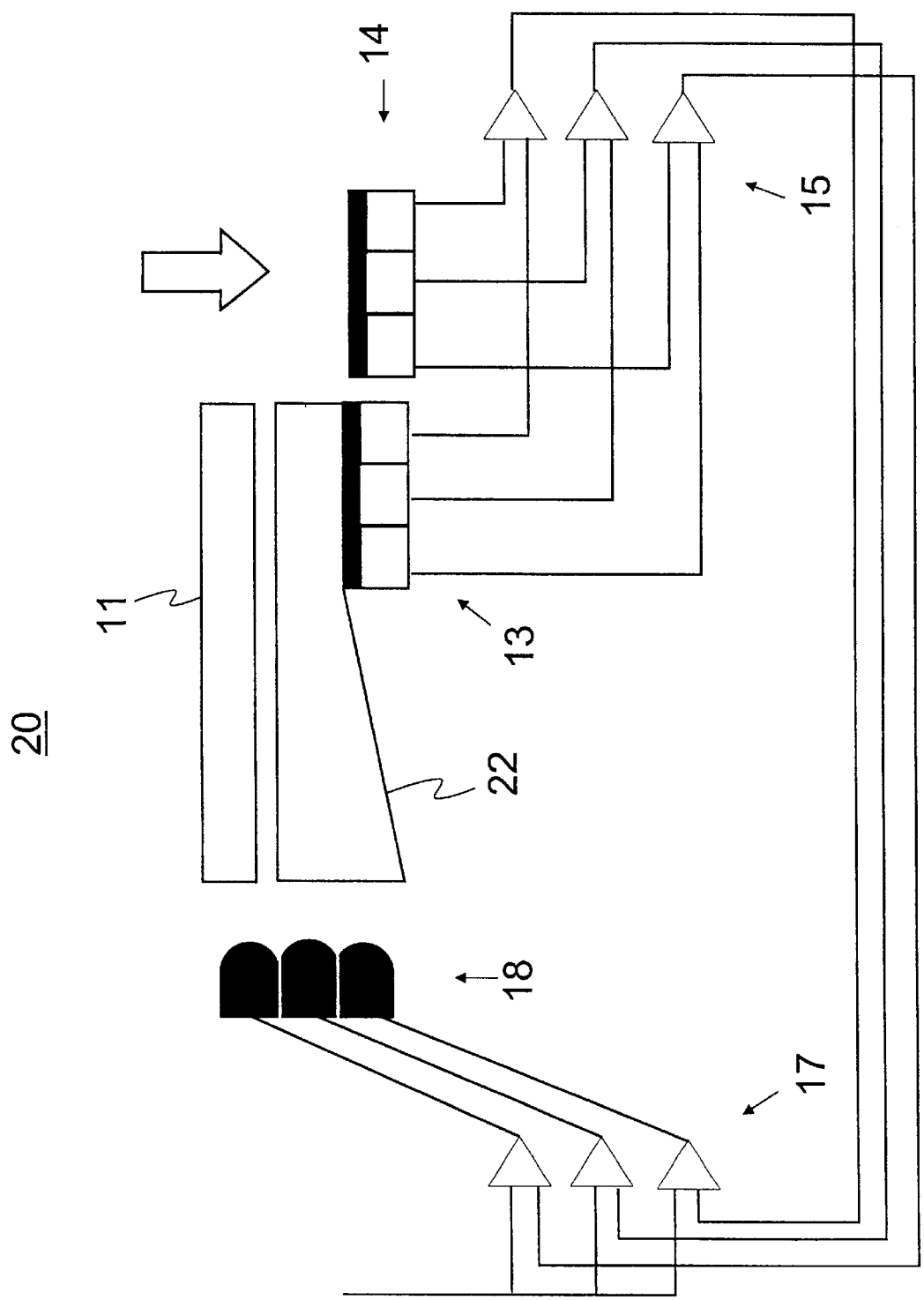
FIG. 2 illustrates a back-illumination system of a second embodiment of the invention.

FIG. 2 illustrates a back-illumination system of a second embodiment of the invention in which system the first colour balance sensor 13 is placed under the photoconductor and therefore no space needs to be reserved adjacent to the photoconductor for the first colour balance sensor.

Figure 3:
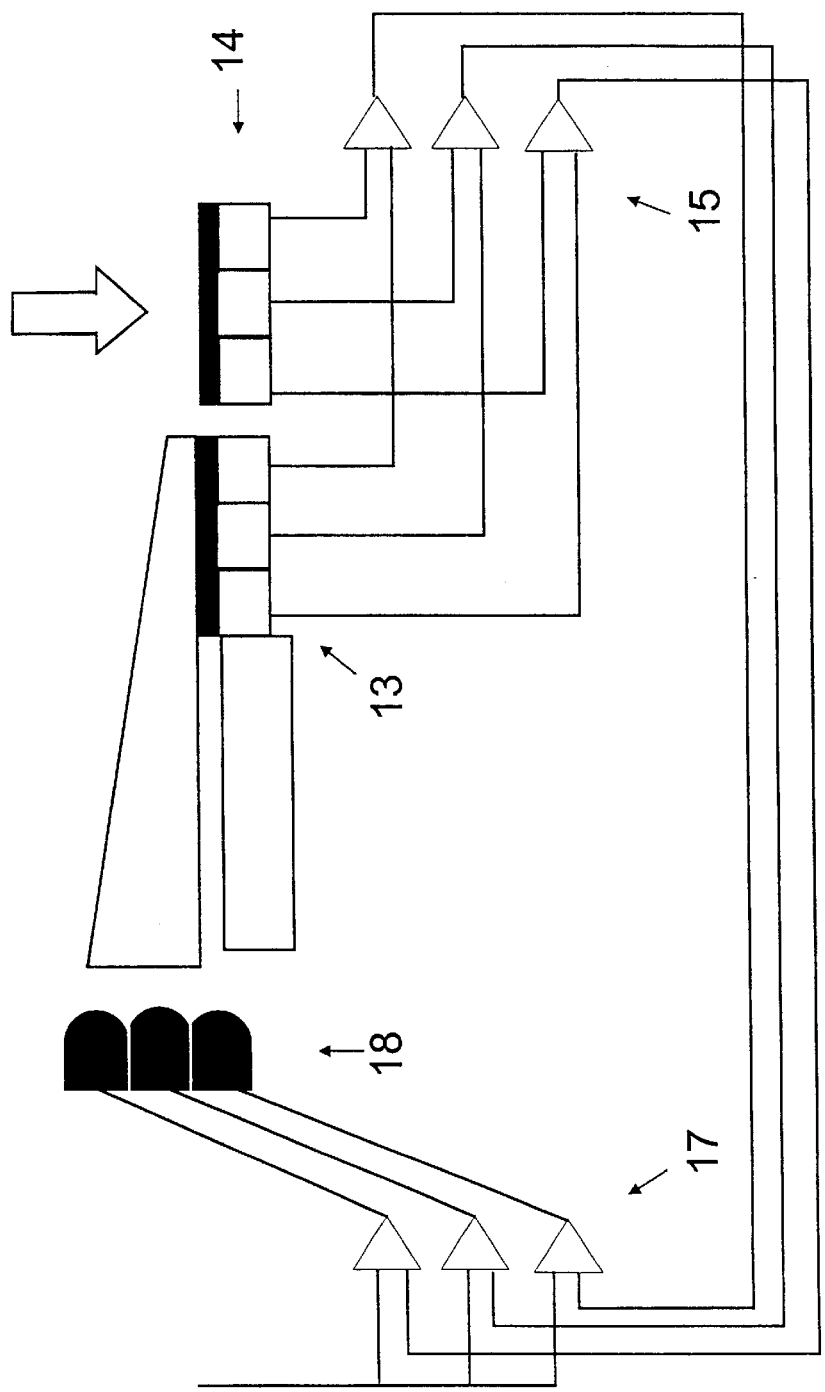
FIG. 3 illustrates a front-illumination system of a third embodiment of the invention.

FIG. 3 illustrates a front-illumination system according to a third embodiment of the invention. In the front-illumination system of FIG. 3, the photoconductor 12 is placed on front side of the display to illuminate the display 11 from the front.

Figure 4:
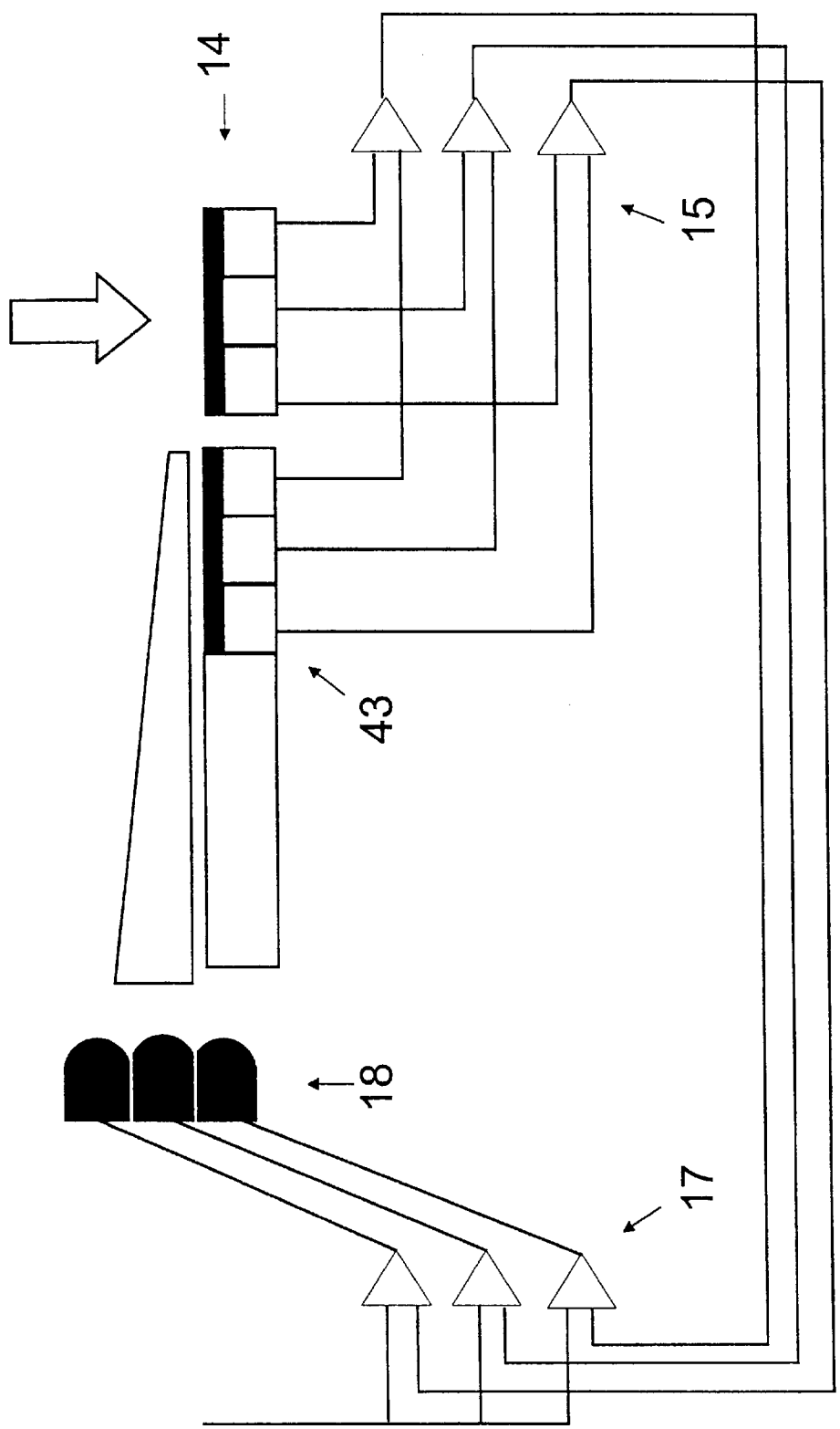
FIG. 4 illustrates a front-illumination system of a fourth embodiment of the invention.

FIG. 4 illustrates a front-illumination system of a fourth embodiment of the invention where a first colour balance sensor 43 is integrated into the liquid crystal display panel 11. Prior art knows that LED can be used for measuring light intensity. It is also known that LEDs of different colours have a different sensitivity for the different main components. It is also known that the LEDs are not necessarily capable of transmitting and receiving the same main components. However, a portion of the liquid crystal display panel 11 can be arranged to serve as the first colour balance sensor 13 of the first preferred embodiment, in which case a separate sensor is not needed. In that case, visual information is not presented on the portion of the liquid crystal display serving as the colour balance sensor when the display is being used for measuring colour balance.

Figure 5:
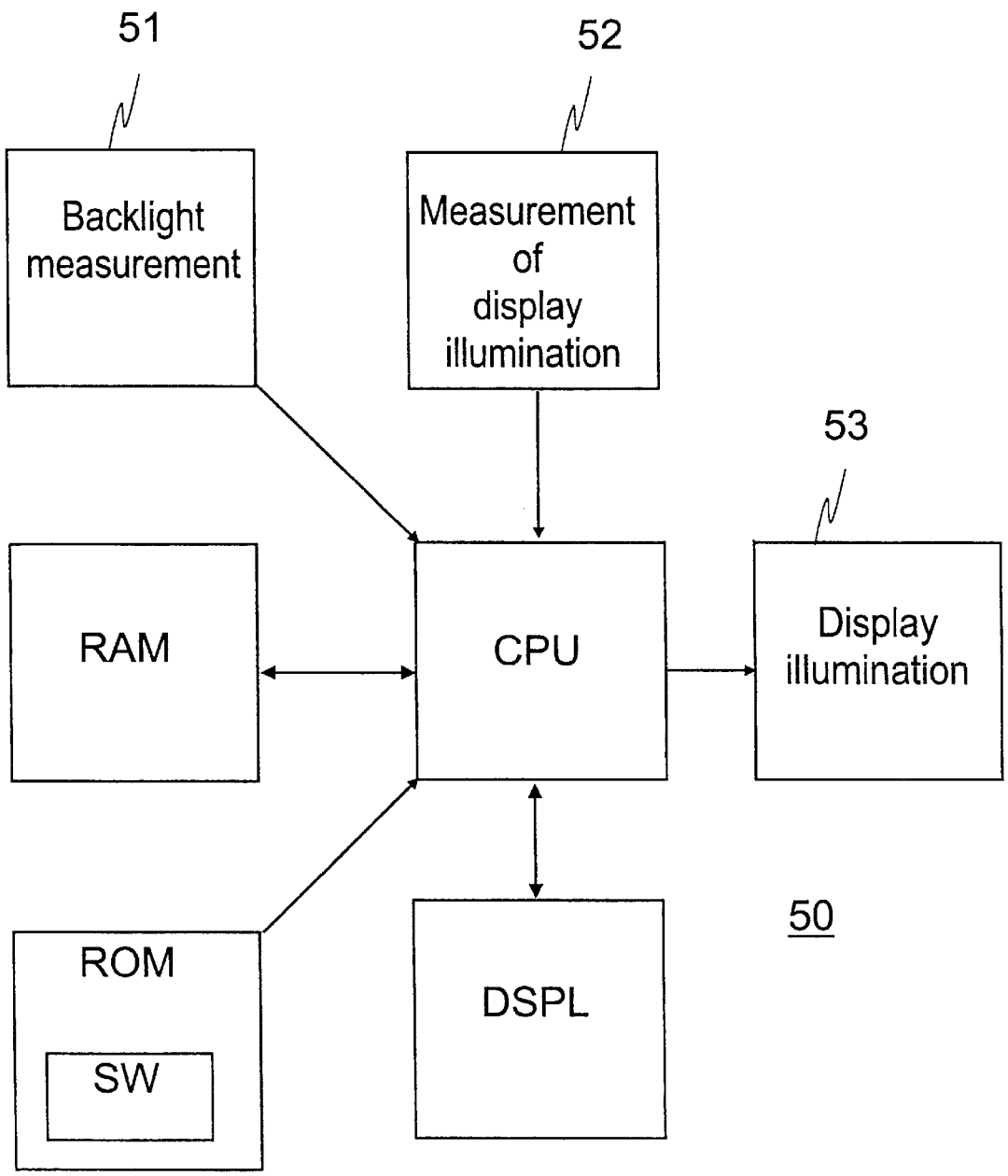
FIG. 5 is a block diagram illustrating a mobile station of a fifth embodiment of the invention.

FIG. 5 is a block diagram illustrating a mobile station 50 of a fifth embodiment of the invention. The mobile station comprises a central processor unit CPU, memory RAM serving as the working memory of the CPU, non-volatile memory ROM which in turn comprises the operational instructions of the processor. The mobile station further comprises a display DSPL, display illumination 53 for illuminating the display, and a display illumination measurement block 52 and a backlight measurement block 51. The processor is arranged to control the display illumination on the basis of the information provided by the backlight measurement block 51 and the display illumination measurement block 52.

Figure 6:
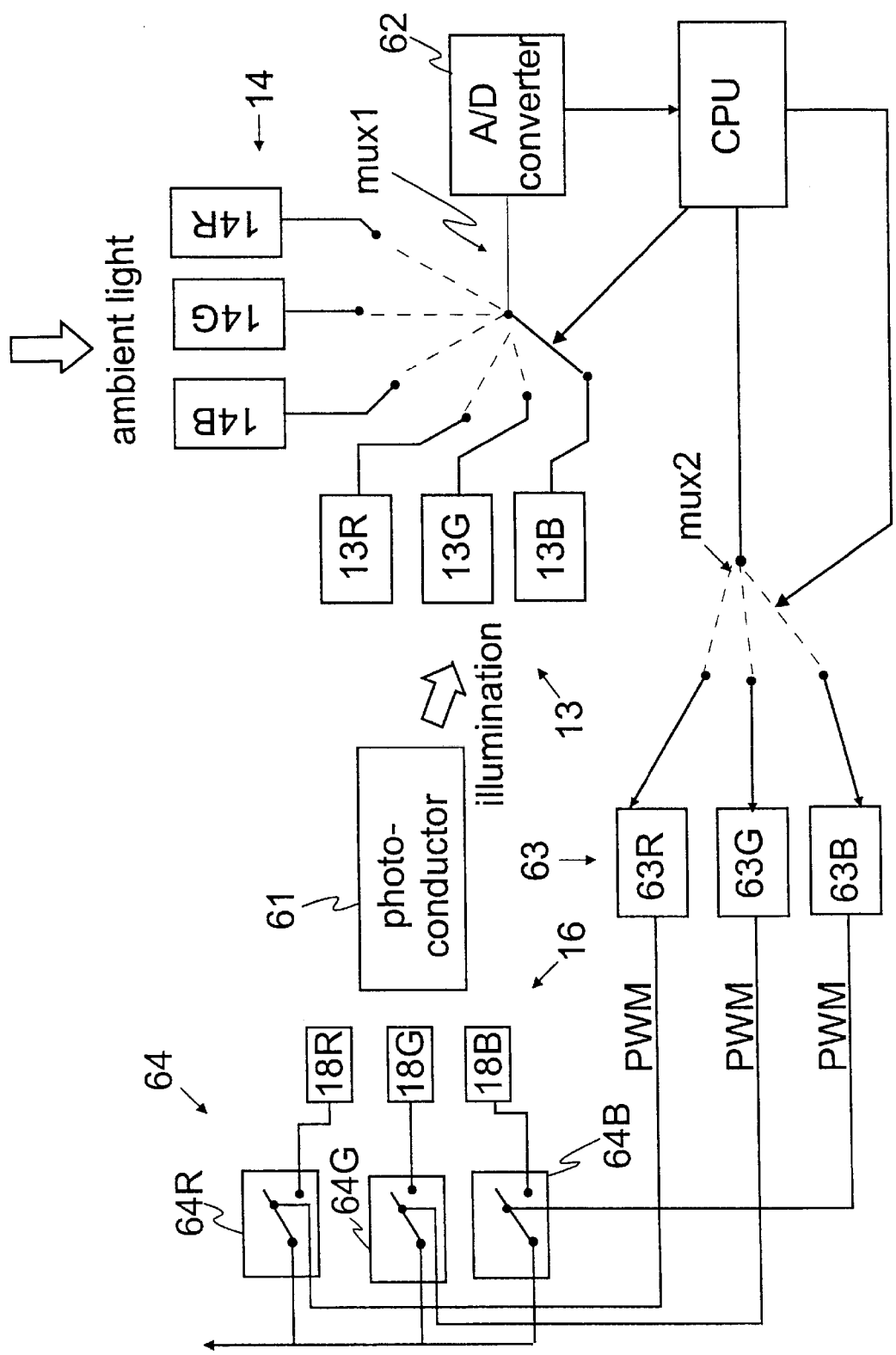
FIG. 6 is a flow diagram illustrating a method for adjusting the illumination system of the display of the mobile station of FIG. 5.

FIG. 6 is a block diagram illustrating the illumination system of the display of the mobile station shown in FIG. 5. The system comprises a photoconductor 61 meant for illuminating the display, the light conducted by the conductor being measured by the illumination colour balance sensor 13. The system further comprises the ambient light colour balance sensor 14 for measuring the colour balance of ambient light. These sensors correspond to the ones described above. In addition, the system comprises a first multiplexer connecting one measurement unit at a time to an AD converter 62 for converting a measurement signal to a digital message illustrating the intensity of the light component measured by the measurement unit in question. The AD converter is connected to the central processing unit CPU. The CPU receives the intensities of the different light components of both illumination and ambient light and uses the intensities to calculate new luminous efficiencies for the display illumination. The calculated luminous efficiencies are transmitted from the CPU through a second multiplexer MUX2 to corresponding control units 63R, 63G, 63B. The control units control the light sources, i.e. in this case LEDs 18R, 18G and 18B, meant for generating their respective light components through the operational connection provided by the unit 64. The operational unit comprises switches 64R, 64G and 64B for each light source, the switches switching off power supply to the light sources according to the control units' commands.

The central processing unit CPU directs the first multiplexer to change the measurement unit (13R–13B, 14R–14B) currently connected to the AD converter so that each measurement unit is repeatedly connected to the AD converter. This allows the CPU to use the AD converter for determining the intensities of each light component both with regard to illumination and ambient light. The CPU calculates new control parameters repeatedly, typically at predetermined intervals, for controlling the illumination and transmits them through the second multiplexer MUX2 to the corresponding control units 63R–63B. The CPU can thus control the first and the second multiplexers at points of time independent of each other. In the following, the operation of the CPU will be described in greater detail with reference to FIG. 7.

Figure 7:
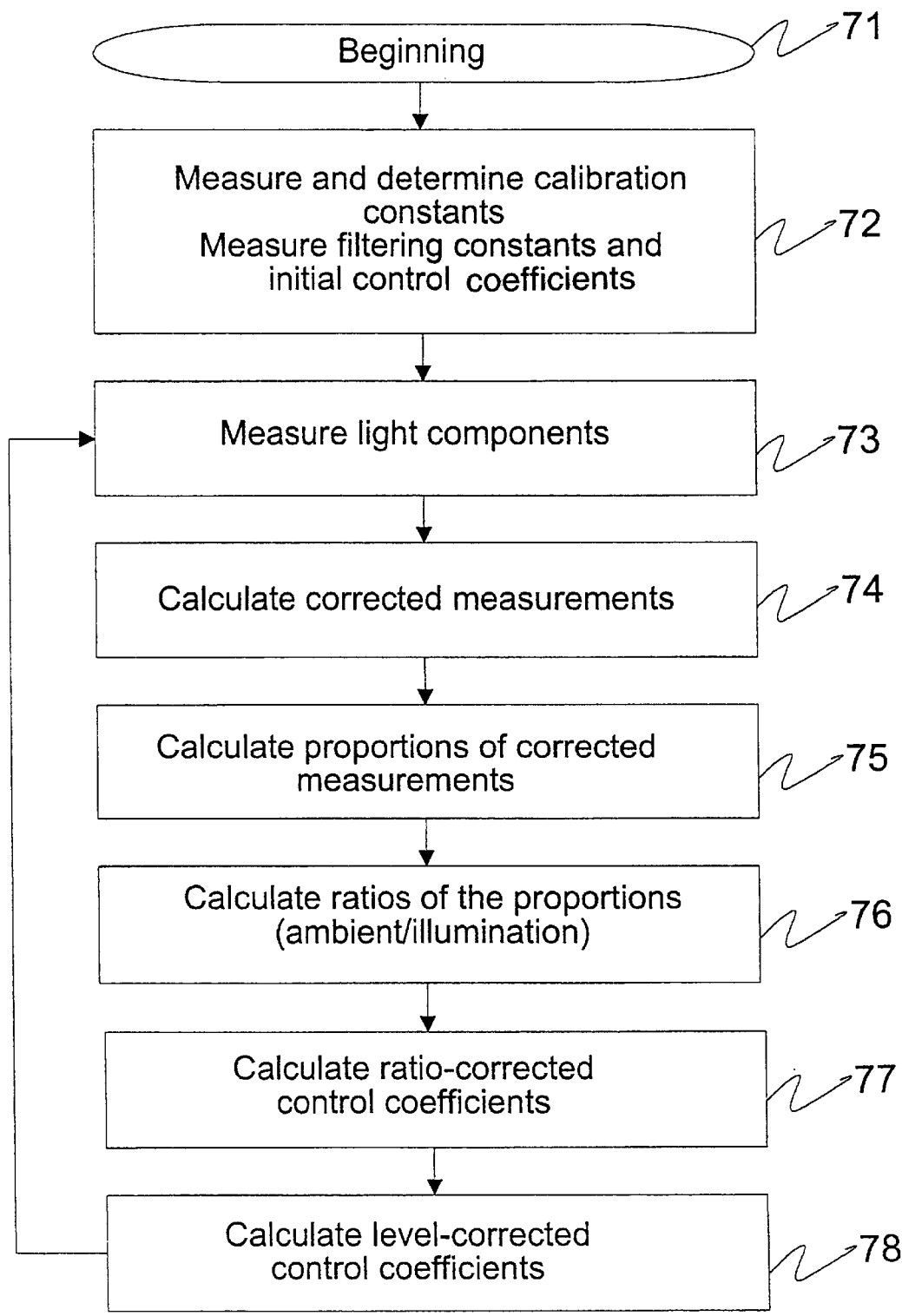
FIG. 7 is a flow diagram illustrating a method for adjusting the illumination system of FIG. 6.

FIG. 7 is a flow diagram illustrating a method for adjusting the illumination system of FIG. 6. The flow diagram covers the initial configuration of the adjustment system and the phases related to its normal operation, the description of which will support the understanding of the invention.

The illumination system of FIG. 6 is based on a gradually proceeding iterative process where the difference in the ratios of the light component intensities of illumination are measured with respect to ratios of the light component intensities of ambient light, and illumination is adjusted such that the whiteness of illumination would correspond to that of ambient light as well as possible. In this embodiment, the brightness of illumination, i.e. the sum of the light component intensities, is adjusted at the same time. Brightness may also be adjusted intelligently such that brightness is increased in a low-light environment and reduced or completely switched off in a well-illuminated environment. In an alternative embodiment of the invention, this is carried out by an attempt to standardise the product of the brightness of illumination and brightness of ambient light, the brightness of illumination being thus inversely proportional to the brightness of ambient light.

It should be noted that the numerical values given below are arbitrarily chosen and that in reality the constants to be formed strongly depend on how sensitive the measuring devices are.

In the following, the flow diagram of FIG. 7 will be described in greater detail with reference to Table I below. Based on a simulated calculation carried out by a spreadsheet program, the table illustrates the operation of the method depicted by the flow diagram.

The flow diagram starts from block "begin". In the next block, correction coefficients are determined for each light component measurement unit (altogether 3+3=6) for correcting individual variation in the sensitivities of the light component measurement units. For the sake of simplicity, the use of level correction factors is ignored in this embodiment, although there is also an alternative embodiment where the output of the measurement units is corrected using not only correction coefficients but also level correction factors which are summed to the measurements preferably prior to the sensitivity correction.

In addition to correction coefficients, also filtering constants used in the adjustment are determined, the constants having an impact on the speed and, thereby, the stability (low oscillation tendency) of the adjustment. In addition, initial control coefficients are determined in connection with the initial configuration. In this embodiment the control coefficients are coefficients used for controlling the intensity of each light source of illumination on the next adjustment round.

After the above measures, which are usually carried out at the manufacturing plant, the device is taken in use and the actual adjustment process begins. First the intensities (R, G, B) of the light components of illumination and those of ambient light are measured and multiplied by the correction coefficients to produce corrected intensities.

Next, the sum of the corrected intensities is calculated to obtain brightness. This is followed by calculating the proportion of the corrected intensity representing each light component of brightness, which allows the reciprocal ratios of the light components to be obtained. For example, Table I first determines the proportion of red component R of brightness: it is 0.215 with regard to ambient light and 0.170 with regard to illumination. The ratio of the proportions is 0.215/0.170=1.263. Table I also comprises a standard deviation calculated from the ratios of the proportions and illustrating a computational difference in whiteness between illumination and ambient light. The greater the standard deviation, the greater the difference will be determined.

The proportion of the brightness of illumination with regard to the target is then calculated to be used later for adjusting brightness towards the target. In the example of Table I, the target value for brightness is 100 (in the units used in the table) and in the first measurement the proportion of brightness (brightness ratio) is 70.47% of the target.

Next, new control coefficients are calculated. This calculation is carried out in two phases. First, new control coefficients corrected according to the differences in the ratios of the proportions are calculated. Then the new control coefficients are level-corrected to adjust brightness towards the desired level.

Each new ratio-corrected control coefficient (for R, G and B components) is calculated from the previous control coefficient on the basis of the ratio of the proportions of ambient light and illumination in the corresponding light component. The new ratio-corrected control coefficient is: the previous control coefficient×(1−ratio correction factor+ratio correction factor×ratio). Table I shows the new control coefficients thus calculated:

| R | G | B |
| --- | --- | --- |
| 1.132 | 1.072 | 0.862 |

In other words, ratio correction aims at increasing illumination provided by components R and G and decreasing illumination provided by component B. By applying the ratio correction factor for filtering the adjustment, the adjustment can be slowed down, which in turn provides improved adjustment stability.

After the ratio correction, level-corrected control coefficients for controlling illumination are calculated for the next control round. Similarly as in ratio correction, level correction also employs filtering for stabilising the adjustment, i.e. for reducing oscillation tendency. The level-corrected control coefficient of R, for example, is calculated using the following formula:

ratio-corrected control coefficient×(1−level correction factor+level correction factor×(1/brightness ratio of illumination)).

When the level-corrected control coefficients have been calculated, they are taken in use to replace the former control coefficients for controlling the intensities of the light components of illumination. The intensities change in the same proportion as the control coefficients, assuming that the electric components used for illumination, i.e. the LEDs in this case, are linear in their operation.

At the beginning of the next adjustment round, the intensities of the light components are again measured with regard to both ambient light and illumination. In this example, the proportional change with regard to each previous measurement of a light component of the ambient is randomly determined, a new "measurement" being provided by the following equation:

(1+(RAND( )−0.5)×random factor_1)×previous measurement.

Similarly, new intensities for the illumination components are measured. The new intensities differ from the previous ones in proportion to the change in the control coefficients. To depict errors possibly occurring in the adjustment and the measurement, adjustment is here disturbed by subjecting the new computational measurements of illumination to some randomness. The new measured (uncorrected) measurement of component R of illumination is calculated by applying the following equation:

(1+(RAND( )−0.5)×random factor_2)×previous measurement×level-corrected control coefficient/previous control coefficient.

On the basis of the new measurements, corrected measurement results are again calculated, the results being then used for producing new level-corrected control coefficients, and so on.

With reference to FIG. 7, Table I below shows a simulated example of the operation of the method of adjustment.

TABLE I

A simulated example of the operation of the method of adjustment.

|  | component | | |
|---|---|---|---|
| Correction constants | R | G | B |
| Constants: | | | |
| ambient light | 2.125 | 1.800 | 1.600 |
| illumination | 1.200 | 0.834 | 0.920 |
| Ratio correction factor | 0.500 | | |
| level correction factor | 0.300 | | |
| random factor_1 | 0.100 | | |
| random factor_2 | 0.050 | | |
| illumination target sum: | 100 | | Total: |
| illumination control coefficients at the beginning | 1.000 | 1.000 | 1.000  3 |
| Measurement 1 | | | |
| ambient light | 4.000 | 11.000 | 7.000 |
| illumination | 10.000 | 37.000 | 30.000 |
| Measurements 1 corrected with correction coefficients | | | total: |
| ambient light | 8.499 | 19.800 | 11.200  39.4988 |
| illumination | 12.000 | 30.865 | 27.600  70.4654 |
| | | | of the  70.47% |
| | | | target: |
| The ratio of measurements 1 corrected with correction coefficients to the sum of the components | | | |
| ambient light | 0.215 | 0.501 | 0.284 |
| illumination | 0.170 | 0.438 | 0.392  st. dev. |
| ratio | 1.263 | 1.144 | 0.724  0.2835 |
| New control coefficients | | | Total: |
| ratio-corrected: | 1.132 | 1.072 | 0.862 |
| level-corrected: | 1.274 | 1.207 | 0.970  3.4514 |
| | | | ratio to  115.0% |
| | | | previous |
| Adjustment round 1, new measurements: | | | |
| ambient light | 4.078 | 11.283 | 6.920 |
| illumination | 12.817 | 43.883 | 29.220 |
| Measurements 2 corrected with correction coefficients | | | total: |
| ambient light | 8.664 | 20.309 | 11.072  40.0450 |
| illumination | 15.381 | 36.607 | 26.882  78.8698 |
| | | | of the  78.87% |
| | | | target: |
| The ratio of measurements 2 corrected with correction coefficients to the sum of the components | | | |
| ambient light | 0.216 | 0.507 | 0.276 |
| illumination | 0.195 | 0.464 | 0.341  st. dev. |
| ratio | 1.109 | 1.093 | 0.811  0.1675 |
| New control coefficients | | | Total: |
| ratio-corrected: | 1.344 | 1.263 | 0.879 |
| level-corrected: | 1.452 | 1.364 | 0.949  3.7656 |
| | | | ratio to  109.1% |
| | | | previous |
| Adjustment round 2, new measurements: | | | |
| ambient light | 3.981 | 11.576 | 6.732 |
| illumination | 11.369 | 41.631 | 28.731 |
| Measurements 3 corrected with correction coefficients | | | total: |
| ambient light | 8.458 | 20.837 | 10.771  40.0664 |
| illumination | 13.643 | 34.728 | 26.432  74.8031 |
| | | | of the  74.80% |
| | | | target: |
| The ratio of measurements 3 corrected with correction coefficients to the sum of the components | | | |
| ambient light | 0.211 | 0.520 | 0.269 |
| illumination | 0.182 | 0.464 | 0.353  st. dev. |
| ratio | 1.158 | 1.120 | 0.761  0.2191 |

TABLE I-continued

A simulated example of the operation of the method of adjustment.

| New control coefficients | | | | Total: |
|---|---|---|---|---|
| ratio-corrected: | 1.566 | 1.446 | 0.836 | |
| level-corrected: | 1.724 | 1.593 | 0.920 | 4.2373 |
| | | | ratio to previous | 112.5% |

In Table II the simulation of Table I is followed during several adjustment rounds. Table II shows how the adjustment reduces both the difference of brightness with regard to the target (level difference, %) and the deviation in the ratios of the light components (the standard deviation, or st.dev.) On each adjustment round, new control coefficients are calculated for light sources corresponding to each light component, the coefficients being then used for operating the light sources.

TABLE II

Operation of illumination adjustment during several control rounds

| | | | control coefficients | | |
|---|---|---|---|---|---|
| round: | st. dev. | level diff. % | R | G | B |
| 0 | 0.28346 | 29.5% | 1 | 1 | 1 |
| 1 | 0.16753 | 21.1% | 1.274 | 1.207 | 0.970 |
| 2 | 0.21909 | 25.2% | 1.452 | 1.364 | 0.949 |
| 3 | 0.05642 | 4.9% | 1.724 | 1.593 | 0.920 |
| 4 | 0.05745 | 3.4% | 1.694 | 1.620 | 0.957 |
| 5 | 0.01882 | 2.5% | 1.657 | 1.638 | 0.991 |
| 6 | 0.02412 | 0.5% | 1.653 | 1.649 | 1.007 |
| 7 | 0.04765 | −0.6% | 1.682 | 1.647 | 1.002 |
| 8 | | | 1.735 | 1.626 | 0.996 |

Table II also shows that the standard deviation of the different colour components decreases faster than the level difference. The reason for this is the higher coefficient used in the filtering. Adjustment rounds are preferably carried out frequently and filtering is used to control that the changes in illumination are so small that the illumination does not appear to be flickering when the adjustment is in operation and yet the changes are carried out rapidly and conveniently.

In an alternative embodiment of the invention, filtering factors of different values are provided in accordance with the direction of change of the illumination, the brightness of the illumination being increased more rapidly than decreased. This is advantageous for example when the invention is applied in a mobile station which may suddenly move into a shadow so that it is difficult to read the display properly. On the other hand, a display which is too brightly illuminated does not cause any major problems in viewing the display, but only wears the battery more rapidly. Choosing the correct filtering factors therefore has an impact on both ergonomics and the energy consumption of the device.

The above described control coefficients allow illumination to be adjusted by applying for example PWM control (Pulse Width Modulation). Each light source is controlled to illuminate the photoconductor with a pulsating light of a sufficiently high frequency (such as 25, 70 or 5000 Hz) to make it appear flicker-free. A PWM signal is used to implement illumination as a specific control-coefficient-dependent portion X of each sequence. X may be obtained for example by the following equation:

$$X = \text{control coefficient}/\text{control coefficient}_{max},$$

wherein the control coefficient$_{max}$ is typically a pre-selected constant that exceeds the normal maximum value of the control coefficient. The control coefficient$_{max}$ may be a common factor for all control coefficients, or it may be separately set for each light component.

In an alternative embodiment of the invention, the system comprises memory for storing previous colour balance measurements. The memory allows the system to adjust the colour balance of illumination even in situations where the intensity of ambient light becomes too low for any measurements.

In addition, the memory can be used for implementing another alternative embodiment of the invention in which the liquid crystal display panel is illuminated with a pulsating light that has a high frequency, >20 Hz, with regard to the perception ability of the human eye. The colour balance meter is also used, during pauses in the illumination, for measuring the colour balance of ambient light and, during the illumination, for measuring the colour balance of illumination. This allows errors in measurement caused by differences between the measurement units to be completely avoided when the intensities of the light components of illumination and ambient light are to be evaluated. This also allows the above-described initial calibration to be left out without harming the white balance of the device. Although this may slightly change the brightness adjustment, because of a deviation in an individual measurement unit, the user may be provided with a manual brightness adjustment which allows the user to obtain the desired target level for brightness.

The above description illustrates the implementation and the embodiments of the invention with references to examples. It is apparent to a person skilled in the art that the invention is not restricted to the details of the above described embodiments and that there are also other alternatives for implementing the invention without deviating from the characteristics of the invention. The described embodiments should be considered to be illustrative, but not restrictive. The alternatives for implementing the invention and using it are therefore only restricted by the accompanying claims, the various alternative embodiments defined in the claims, and also any equivalent implementations, being thus included in the scope of the invention.

What is claimed is:

1. A method for producing white light for illuminating an object, in which method light of a first colour having a first luminous power and light of a second colour having a second luminous power are produced to illuminate the object, wherein the method comprises the steps of:
   measuring the first luminous power;
   measuring the second luminous power; and
   adjusting the white balance of the object's illumination by adjusting the first or the second luminous power on the basis of the measured luminous powers of the lights of the first and second colours, wherein the adjustment of the first luminous power comprises the sub-steps of:
      intermitting the producing of the light of the first colour so that it is on for only a proportion of the time the object is being illuminated; and
      adjusting said proportion to adjust the first luminous power.

2. A method according to claim 1, wherein lights of at least three different colours are produced for illuminating the object.

3. A method according to claim 2, wherein the white balance of the object's ambient light is also measured and the luminous power of light of at least one colour to be produced is adjusted in relation to at least one of the other luminous powers to make the luminous power correspond better to the measured white balance of ambient light.

4. An apparatus for illuminating an object with white light, the apparatus comprising:
   first illuminating means for producing light of a first colour having a first luminous power;
   second illuminating means for producing a light of a second colour having a second luminous power;
   means for measuring the first luminous power;
   means for measuring the second luminous power; and
   means for adjusting the white balance of the object's illumination by adjusting the first or second luminous power on the basis of the measured first and second luminous powers, wherein the adjusting the first luminous power comprises intermitting the producing of the light of the first colour so that it is on for only a proportion of the time the object is being illuminated and adjusting the proportion to adjust the first luminous power.

5. An apparatus according to claim 4, the apparatus further comprising
   means for measuring the white balance of the object's ambient light; and
   means for adjusting at least one luminous power in relation to the measured white balance of ambient light.

6. An apparatus according to claim 4, the apparatus also comprising at least partially common processing means for alternately measuring the different luminous powers.

7. An apparatus according to claim 4, the apparatus being arranged to iteratively adjust the white balance of the object's illumination during illumination.

8. An apparatus according to claim 4, the apparatus being arranged to apply a first measurement unit to measure the luminous power of light of a first colour in a significantly normalised illumination with regard to the light in question to determine at least one individual measurement unit charcteristic and to use it for correcting a later measurement.

9. An apparatus according to claim 4, wherein the object to be illuminated is a display for visual presentation of information.

10. An apparatus according to claim 9, wherein the means for measuring the first luminous power and the means for measuring the second luminous power are arranged in the vicinity of the display.

11. An apparatus according to claim 9, wherein a portion of the display is arranged to serve at least occasionally as the means for measuring the at least one luminous power.

12. An apparatus according to claim 4, wherein at least one set of illuminating means is arranged to intermit light according to a PWM-modulated (Pulse Width Modulation) signal.

13. An apparatus according to claim 4, the apparatus being selected from a group comprising the following alternatives: mobile station, electronic camera, electronic video camera, electronic book, portable computer, display with back illumination, display with front illumination, and an illuminating device for a work of art.

14. A method according to claim 1, wherein the adjustment of the second luminous power comprises intermitting the producing of the light of the second colour.

15. A method according to claim 1, wherein the repeated interrupting of the illumination corresponds to a Pulse Width Modulated signal.

16. A method according to claim 1, wherein the object is a display.

17. A method according to claim 1, wherein the white balance of the object's ambient light is measured intermittently on instants of time when the producing of the light of the first colour is interrupted and said proportion is adjusted in accordance with the measured white balance of ambient light.

18. A method according to claim 1, wherein the intermitting takes place so that the illumination appears non-flickering.

19. An apparatus according to claim 4, wherein the frequency of the intermitting is high enough to make the illuminating appear flicker free.

20. An apparatus according to claim 4, comprising means for adapting the illuminating according to ambient light white balance configured to use the means for measuring the first luminous power on instants when the means for producing a light of the first colour have been interrupted.

* * * * *